US010317979B2

(12) United States Patent
Tu et al.

(10) Patent No.: US 10,317,979 B2
(45) Date of Patent: *Jun. 11, 2019

(54) MECHANISM FOR FACILITATING POWER EXTENSION SERVICE AT COMPUTING DEVICES BY ONE OR MORE POWER SAVING TECHNIQUES

(71) Applicant: Intel Corporation, Santa Clara, CA (US)

(72) Inventors: Xiaoxing Tu, Shanghai (CN); Fei Li, Shanghai (CN); Jie Yang, Shanghai (CN)

(73) Assignee: Intel Corporation, Santa Clara, CA (US)

(*) Notice: Subject to any disclaimer, the term of this patent is extended or adjusted under 35 U.S.C. 154(b) by 160 days.

This patent is subject to a terminal disclaimer.

(21) Appl. No.: 15/396,311

(22) Filed: Dec. 30, 2016

(65) Prior Publication Data

US 2017/0115721 A1   Apr. 27, 2017

Related U.S. Application Data

(63) Continuation of application No. 14/924,936, filed on Oct. 28, 2015, now Pat. No. 9,710,053, which is a (Continued)

(51) Int. Cl.
*G06F 1/00* (2006.01)
*G06F 1/26* (2006.01)
(Continued)

(52) U.S. Cl.
CPC ............ *G06F 1/3265* (2013.01); *G06F 1/32* (2013.01); *G06F 1/3212* (2013.01); *G06F 1/3287* (2013.01)

(58) Field of Classification Search
CPC .................................................... G06F 1/3265
See application file for complete search history.

(56) References Cited

U.S. PATENT DOCUMENTS

| 6,222,347 B1 | 4/2001 | Gong |
| 6,445,932 B1 | 9/2002 | Soini et al. |

(Continued)

FOREIGN PATENT DOCUMENTS

| CN | 1313558 | 9/2001 |
| CN | 101782803 | 7/2010 |

(Continued)

OTHER PUBLICATIONS

Non-Final Office Action from Chinese Patent Application No. 201510848144.7 notified Jun. 8, 2018, 4 pgs.

(Continued)

*Primary Examiner* — Mohammed H Rehman
(74) *Attorney, Agent, or Firm* — Green, Howard & Mughal LLP

(57) ABSTRACT

A mechanism is described for facilitating power extension service at computing devices according to one embodiment of the invention. A method of embodiments of the invention includes calculating potential power saving by one or more of a plurality of power-saving techniques supported by a computing device. The calculating includes identifying the one or more of the plurality of power-saving techniques that are available for selection and an expected amount of power to be saved with the one or more of the plurality of power saving techniques. The method may further include generating a list identifying the one or more of the plurality of power-saving techniques and relevant information resulting from the calculation, and displaying the list.

23 Claims, 8 Drawing Sheets

Related U.S. Application Data continuation of application No. 13/977,681, filed as application No. PCT/CN2011/002146 on Dec. 21, 2011, now Pat. No. 9,753,528.

(51) Int. Cl.
  *G06F 1/32* (2019.01)
  *G06F 1/3234* (2019.01)
  *G06F 1/3212* (2019.01)
  *G06F 1/3287* (2019.01)

(56) References Cited

U.S. PATENT DOCUMENTS

| | | | |
|---|---|---|---|
| 7,334,144 B1* | 2/2008 | Schlumberger | G06F 1/3221 455/574 |
| 7,340,623 B2 | 3/2008 | Kato et al. | |
| RE43,211 E | 2/2012 | Schlumberger | |
| 8,250,384 B2* | 8/2012 | Borghetti | G06F 1/3203 713/300 |
| 8,526,906 B1 | 9/2013 | Oroskar et al. | |
| 9,268,386 B2 | 2/2016 | Cheng et al. | |
| 2001/0028059 A1 | 10/2001 | George et al. | |
| 2005/0229226 A1 | 10/2005 | Relan | |
| 2005/0268127 A1* | 12/2005 | Shiba | H04N 1/00928 713/320 |
| 2006/0031692 A1 | 2/2006 | Kato et al. | |
| 2007/0046618 A1 | 3/2007 | Imai | |
| 2008/0051027 A1 | 2/2008 | Lee | |
| 2008/0158113 A1 | 7/2008 | Koji | |
| 2009/0094473 A1* | 4/2009 | Mizutani | G06F 1/3203 713/340 |
| 2009/0287943 A1 | 11/2009 | Brey et al. | |
| 2010/0048253 A1* | 2/2010 | Park | G06F 1/1613 455/566 |
| 2010/0195375 A1 | 8/2010 | Park et al. | |
| 2010/0241888 A1 | 9/2010 | Kaneko et al. | |
| 2010/0315249 A1* | 12/2010 | Imai | G06F 1/263 340/636.12 |
| 2011/0138197 A1 | 6/2011 | Lakshmanan | |
| 2011/0254760 A1 | 10/2011 | Lloyd | |
| 2012/0140601 A1 | 6/2012 | Nakagawa | |
| 2012/0216054 A1 | 8/2012 | Cho | |
| 2012/0233361 A1 | 9/2012 | Dalal et al. | |
| 2012/0233480 A1 | 9/2012 | Tanaka | |
| 2012/0254642 A1 | 10/2012 | Mizuura | |

FOREIGN PATENT DOCUMENTS

| | | |
|---|---|---|
| CN | 102195304 | 9/2011 |
| EP | 1139205 | 10/2001 |
| EP | 2120128 | 11/2009 |
| JP | 2005107606 | 4/2005 |
| JP | 2007250863 | 9/2007 |
| TW | 200513884 | 4/2005 |
| TW | 200527657 | 8/2005 |
| TW | I262380 | 9/2006 |
| TW | 200829008 | 7/2008 |
| WO | 2011064933 | 6/2011 |

OTHER PUBLICATIONS

Notice of Allowance received from Taiwan Patent Application No. 105128057 notified Jul. 23, 2018, 3 pgs.
Non-Final Office Action from Chinese Patent Application No. 201510848144.7 notified Nov. 1, 2017, 11 pgs.
Non-Final Office Action from R.O.C. (Taiwanese) Patent Application No. 105128057 notified Nov. 9, 2017, 3 pgs.
Final Office Action for U.S. Appl. No. 13/977,681 dated Mar. 22, 2017, 11 pages.
Notice of Allowance for U.S. Appl. No. 14/924,936 dated Mar. 30, 2017, 10 pages.
U.S. Appl. No. 13/977,681 Final Office Action, dated Nov. 25, 2015.
U.S. Appl. No. 13/977,681 Non Final Office Action, dated Jul. 7, 2015.
U.S. Appl. No. 13/977,681, Final Office Action, dated Jul. 29, 2016, 12 pages.
U.S. Appl. No. 13/977,681, Non Final Office Action dated Apr. 7, 2016, 15 pages.
U.S. Appl. No. 14/924,936 Non-Final Office Action, dated Feb. 1, 2016, 18 pages.
Advisory Action for U.S. Appl. No. 13/977,681, dated Feb. 9, 2016.
Advisory Action for U.S. Appl. No. 13/977,681, dated Oct. 13, 2016.
Advisory Action for U.S. Appl. No. 14/924,936, dated Oct. 11, 2016.
Final Office Action for U.S. Appl. No. 14/924,936, dated Aug. 2, 2016.
First Office Action for Chinese Patent Application No. 201180075638.6 dated Nov. 4, 2015.
Non-Final Office Action for U.S. Appl. No. 13/977,681 dated Feb. 3, 2017, 10 pages.
Non-Final Office Action for U.S. Appl. No. 14/924,936 dated Feb. 3, 2017, 9 pages.
Office Action and Search Report for Taiwan Patent Application No. 101144706, dated Feb. 11, 2015.
Office Action and Search Report for Taiwan Patent Application No. 103118804, dated May 11, 2016.
Office Action for German Patent Application No. 112011106028.9 dated Apr. 25, 2016.
Office Action for German Patent Application No. 112011106028.9 dated Jan. 2, 2017.
PCT/CN2011/002146PCT International Search Report and Written Opinion, dated Sep. 27, 2012, 10 pages.
Second Office Action for Chinese Patent Application No. 201180075638.6, dated Jul. 5, 2016.
Corrected Notice of Allowance for U.S. Appl. No. 14/924,936, dated Jun. 15, 2017.
Notice of Allowance for U.S. Appl. No. 13/977,681 dated May 12, 2017, 8 pages.
Search Report for Taiwan Patent Application No. 105128057, dated May 31, 2017.
Non-Final Office Action for U.S. Appl. No. 15/594,479, notified Dec. 14, 2018, 10 pgs.
Notice of Grant for Chinese Patent Application No. 201510848144.7 notified Jan. 8, 2019, 3 pages.

* cited by examiner

MECHANISM FOR FACILITATING POWER EXTENSION SERVICE AT COMPUTING DEVICES BY ONE OR MORE POWER SAVING TECHNIQUES

CLAIM OF PRIORITY

This United States continuation patent application is related to, and claims priority to, U.S. patent application Ser. No. 14/924,936 filed Oct. 28, 2015, which is related to, and claims priority to, U.S. patent application Ser. No. 13/977,681 filed Jun. 29, 2013, and to corresponding International Patent Application No. PCT/CN2011/002146 filed Dec. 21, 2011, the entire contents of which are also incorporated herein by reference.

FIELD

The field relates generally to computing devices and, more particularly, to employing a mechanism for facilitating power extension service at computing devices.

BACKGROUND

Insufficient battery life is one of the major issues any user of mobile computing devices (e.g., smartphones, tablet computers, notebooks, netbooks, etc.) faces today. It is common for a user to encounter a situation when they want their computing device to stand a longer period of time when the battery is low in direct current (DC) mode. Typically, in that case, one choice the user gets is switching the computing device to the maximum battery life (MBL) mode, which does not utilize various power saving techniques nor does it tell the user how long the battery will be extended; hence, keeping the user in the dark about what aspects of the computing device are being sacrificed in order to save power.

BRIEF DESCRIPTION OF THE DRAWINGS

Embodiments of the present invention are illustrated by way of example and not by way of limitation in the figures of the accompanying drawings, in which like references indicate similar elements and in which.

DETAILED DESCRIPTION

Embodiments of the invention provide a mechanism for facilitating power extension service at computing devices according to one embodiment of the invention. A method of embodiments of the invention includes calculating potential power saving by one or more of a plurality of power-saving techniques supported by a computing device. The calculating includes identifying the one or more of the plurality of power-saving techniques that are available for selection and an expected amount of power to be saved with the one or more of the plurality of power saving techniques. The method may further include generating a list identifying the one or more of the plurality of power-saving techniques and relevant information resulting from the calculation, and displaying the list.

Figure 1:
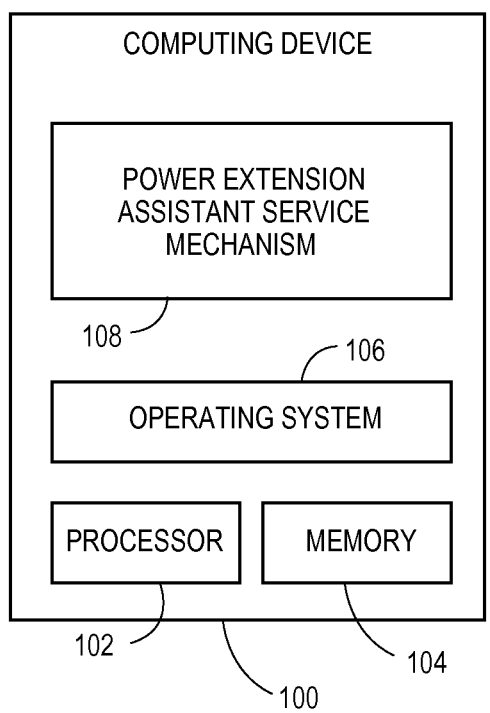
FIG. 1 illustrates a computing device employing a power extension assistant service mechanism for facilitating power extension service at computing devices according to one embodiment of the invention of the invention.

FIG. 1 illustrates a computing device employing a power extension assistant service mechanism for facilitating power extension service at computing devices according to one embodiment of the invention. In one embodiment, a computing device 100 is illustrated as having a power extension assistant service ("PEAS") mechanism 108 (herein referred to as "PEAS mechanism", "power service mechanism", or simply "mechanism") to employ and facilitate power extension service in computing devices 108. Computing device 100 may include mobile computing devices, such as smartphones (e.g., iPhone®, BlackBerry®, etc.), handheld computing devices, PDAs, tablet computers (e.g., iPad®, Samsung® Galaxy Tab®, etc.), laptop computer (e.g., notebook, netbook, etc.), e-reader (e.g., Kindle®, Nook®, etc.), etc. Computing device 100 may further include set-top boxes (e.g., Internet-based cable television set-top boxes, etc.), larger computers, such as desktop computers, server computers, etc.

Computing device 100 includes an operating system 106 serving as an interface between any hardware or physical resources of the computer device 100 and a user. Computing device 100 further includes one or more processors 102, memory devices 104, network devices, drivers, or the like. It is to be noted that terms like "machine", "device", "computing device", "computer", "computing system", and the like, are used interchangeably and synonymously throughout this document.

Figure 2A:
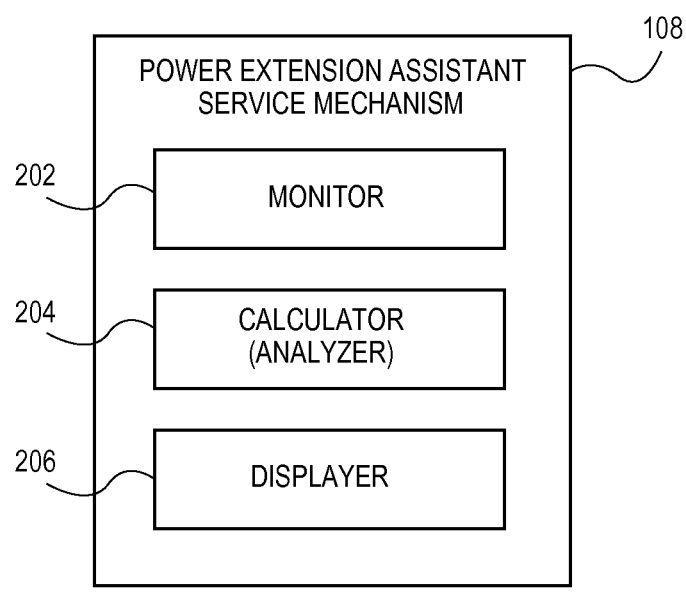
FIG. 2A illustrate a power extension assistant service mechanism employed at a computing device according to one embodiment of the invention.

FIG. 2A illustrates a power extension assistant service mechanism employed at a computing device according to one embodiment of the invention. In one embodiment PEAS mechanism 108 allows the user of a computing device (e.g., mobile computing device) to have the ability to customize configurations relating to extending battery life such that to have multiple options of knowing not only the amounts of battery that can be extended, but also at what expense, such as what aspects or components of the computing device would have to be reduced or entirely sacrificed (to sustain or attain the increase in power). In one embodiment, a service tool may be introduced by the PEAS mechanism 108 to integrate various power saving technologies (e.g., Intel® power saving technologies, like Intel Display Brightness ("ADB"), Intel Display Power Saving Technology ("DPST"), Intel Display Refresh Rate Switching Technology ("DRRS")) and provide multiple choices to users regarding how long the battery can be extended under each choice.

In one embodiment, PEAS mechanism 108 provides a monitor 202 to maintain and monitor a power saving method list that records each of the possible approaches or techniques that are supported by the computing device to save power. Examples of such approaches include the aforementioned ADB, DPST, DRRS, etc. It is contemplated that the embodiments of the present invention are not limited to merely Intel-based ADB, DPST, and DRRS, but that they are compatible with and employ and number and types of power-saving methods/techniques. However, for brevity, simplicity and ease of understanding, ADB, DPST and DRRS are discussed as examples of power-saving methods throughout this document. For example, one of ADB, DPST and DRRS may be chosen to decrease backlight and adjust wireless settings (e.g., 802.11 Power-Save Poll), etc., as it is known that display and Wi-Fi are considered highest in power consumption on any mobile computing platform. Further, when the service tool provided through the PEAS mechanism 108 is launched, the service tool may then query the computing device to determine which of the power saving methods listed in the list are supported by the computing device so that an updated list of power-saving methods supported by the computing device may be maintained.

In one embodiment, PEAS mechanism 108 may provide the user with options to set or reset various configuration settings relating to saving battery power, such as which of the available power-saving methods is preferable when having multiple choices, setting a threshold level (e.g., 7%) of the remaining battery power to trigger the service tool, and the like. For example, the monitor 202 not only maintains the list of power-saving techniques, but also continuously monitors the various threshold levels set by the user, such as when the batter power level lowers to the user-set threshold level (e.g., 7%), the monitor 202 triggers the power-saving process. The power-saving process may include the monitor 202 triggering a calculator 204 (that includes an analyzer or interpreter) to determine the available power-saving techniques and make necessary adjustments to prepare a list of options for the user. For example, one adjustment may relate to changing ADB from disable to enable, increase the DPST level, change refresh rate in DRRS, and disable wireless availability if no network application is running or switch Wi-Fi to power a power-saving mode.

Upon having the analysis done by the calculator 204, a displayer 206 (including a user interface) brings up a dialog box that provides the user with relevant information, such as the current battery status (e.g., remaining battery life), and options, such as a list of available power-saving techniques, and the like. Further, the user may click on one of the available options to find out additional details, such as what power-saving technique is being used, which of the existing components or functionalities (e.g., wireless, etc.) are being sacrificed, what impact it will have on certain other functionalities that may be preferable to the user (e.g., brightness, etc.). The user may study these details and choose one of the battery-saving options from the pop-up list. If, for some reason (e.g., based on user's set configurations), if enough or particular battery-saving options are not available (e.g., only one battery-saving option is available to extent the batter from the remaining 6 minutes to 8 minutes or from 7% to 9%, etc.), the PEAS mechanism 108, using the displayer 206, may display or report out to the user one or more reasons (e.g., software applications) that are preventing the PEAS mechanism 108 from adapting one of the power-saving techniques (e.g., ADB, DPST, DRRS, PS-Poll, etc.) to lower the real-time power consumption, such as displaying something like "suggestion: network copying".

Unlike conventional power saving schemes, in one embodiment, the power-saving options offered by the PEAS mechanism 108 are not merely operating system-dependent options. Stated differently, the PEAS mechanism 108 considers and analyzes power-saving techniques supported by the underlying computing device and is not limited to merely those that are dependent on and identified by the operating system. The calculator 204 automatically considers and calculates different power-saving techniques and their combinations to propose multiple power-saving options to the user.

It is contemplated that any number and type of components may be added to and removed from the PEAS mechanism 108 to facilitate the workings and operability of the PEAS mechanism 108 to provide power extension services at computing devices. For brevity, clarity, ease of understanding and to focus on the PEAS mechanism 108, many of the default or known components of a computing device are not shown or discussed here.

Figure 2B:
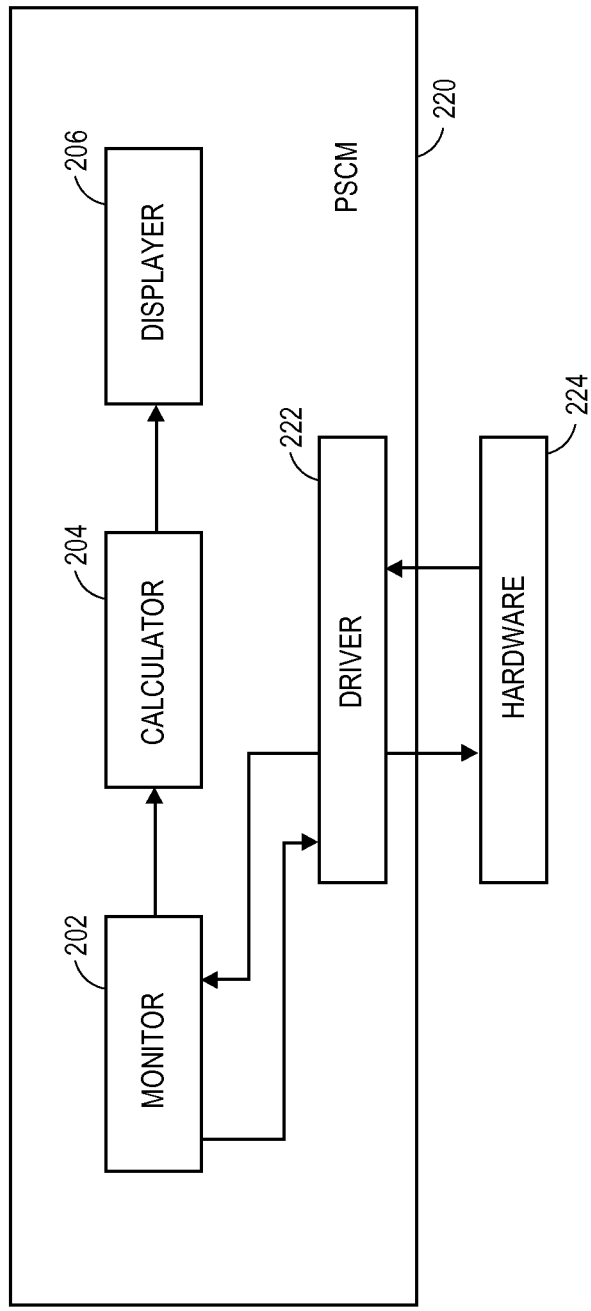
FIG. 2B illustrates power-saving calculation method components employed at a computing device according to one embodiment of the invention.

Now referring to FIG. 2B, it illustrates various power-saving calculation method ("PSCM") components according to one embodiment. For example, in one embodiment, the aforementioned components 202-206 of the PEAS mechanism 108 are shown as in communication with system hardware 224 through a driver 222 of the computing device where the PEAS mechanism 108 is employed. The driver 222 may include software, hardware or firmware including a device driver or software driver representing a computer program or application allowing the PEAS mechanism 108 to interact and work with the hardware 224 of the computing device. A combination of the PEAS mechanism 108 and the driver 222 are referred to as PSCM components 220.

In one embodiment, the calculator 204 uses other components 202, 206 and known information (e.g., data relating to power-saving techniques like the ADB, DPST, etc.) to calculate how much and in what manner power can be saved by each power-saving technique, such as ADB and DPST, to, for example, save platform power by decreasing the backlight of a display panel (e.g., low voltage differential signaling (LVDS)-based display panel), thus the average backlight adjustment is proportional to the power saved. Based on this knowledge and other aforementioned information, the calculator 204 can calculate how and how much power is to be saved using various available power-saving techniques.

As aforementioned, the monitor 202 performs various tasks, such as monitors the computing device's status, records backlight status for each change, trigger an initialization phase to gather the initial backlight by querying the driver 222 and initial computing device time, etc. The calculator 204 calculates the actual power to be saved based on the available techniques, etc., while the displayer 208 provides a user interface and presents the results having power-saving options to the user by, for example, Graphics User Interface (GUI), text, charts or graphs, system log, or the like.

Figure 3A:
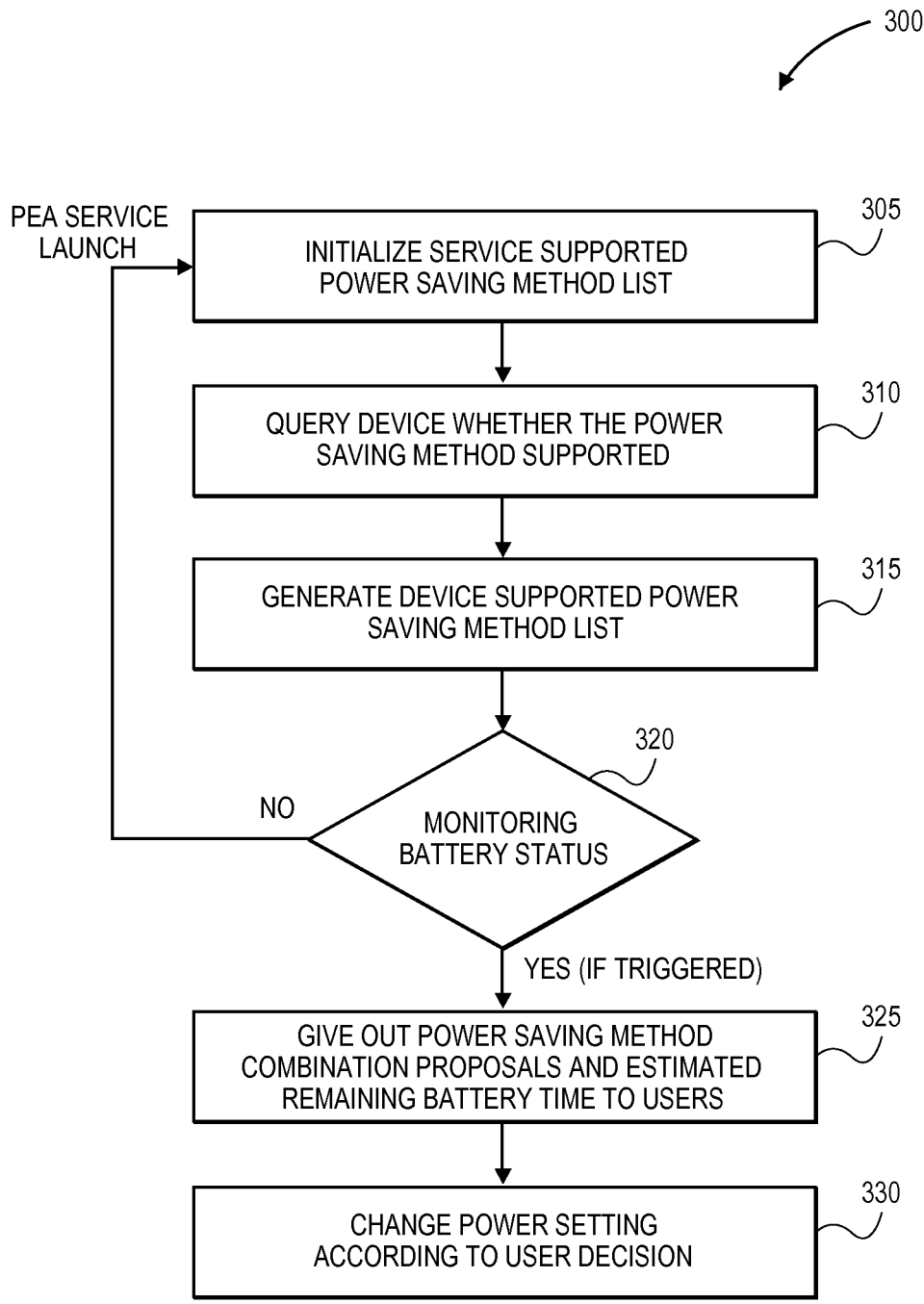
FIG. 3A illustrates a method for facilitating power extension service at a computing device according to one embodiment of the invention.

FIG. 3A illustrates a method for facilitating power extension service at a computing device according to one embodiment. Method 300 may be performed by processing logic that may comprise hardware (e.g., circuitry, dedicated logic, programmable logic, etc.), software (such as instructions run on a processing device), or a combination thereof. In one embodiment, method 300 may be performed by the PEAS mechanism At block 320, battery power status is continuously monitored to determine whether the power status has reached one or more user-defined or other thresholds. If the threshold is not reached, the process may continue with initializing at block 305 or the battery status is continuously monitored. If a threshold is reached, further process is triggered to generate a list proposals relating to various power-saving techniques, an amount of power to be saved by each power-saving technique, a list of computing device components or services or functionalities to be compromised or sacrificed, the remaining battery time, etc., for the user. At processing block 330, the user decides and chooses one of the power-saving settings or options provided by the PEAS mechanism.

Figure 3B:
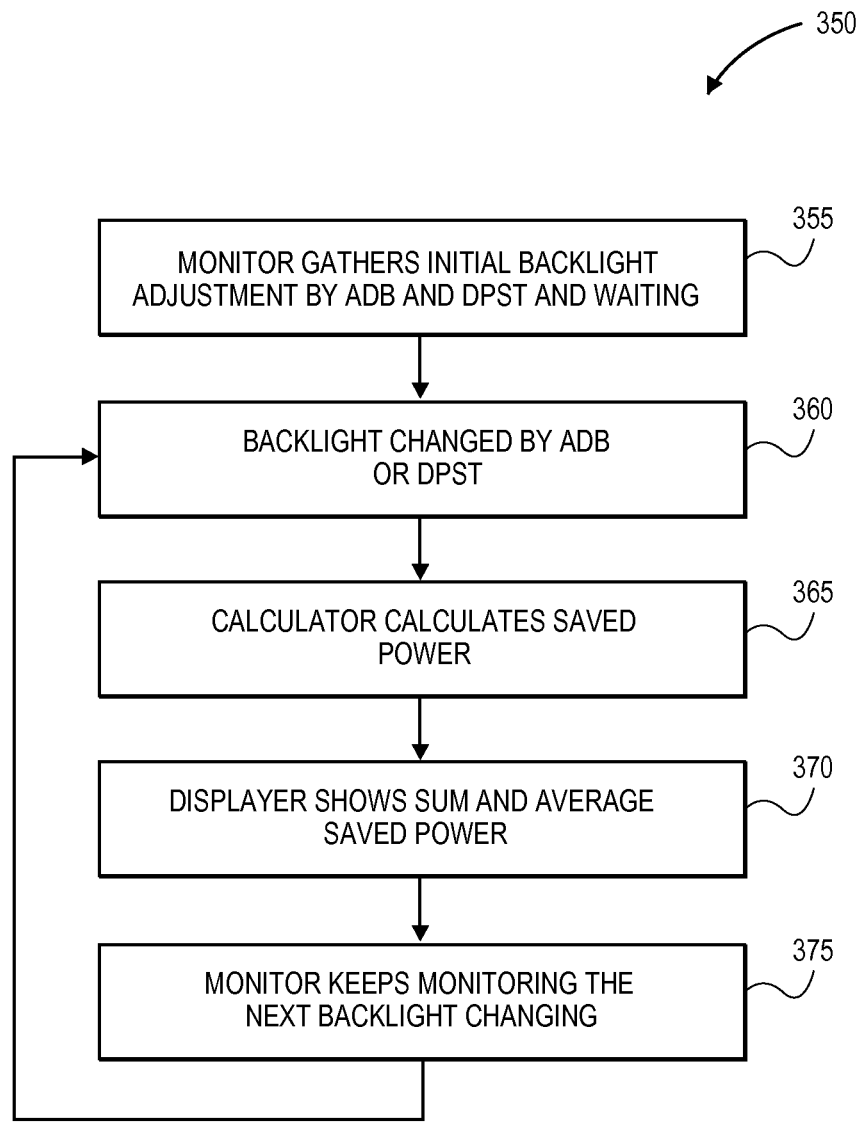
FIG. 3B illustrates a method for facilitating power extension service by performing a power saving calculation method at a computing device according to one embodiment of the invention.

FIG. 3B illustrates a method for facilitating power extension service by performing a power saving calculation method at a computing device according to one embodiment. Method 350 may be performed by processing logic that may comprise hardware (e.g., circuitry, dedicated logic, programmable logic, etc.), software (such as instructions run on a processing device), or a combination thereof. In one embodiment, method 350 may be performed by the PEAS mechanism and PSCM components of FIGS. 1, 2A and 2B.

Method 350 starts at block 355 with the monitor gathering initial backlight adjustment by various available and computer device-supported power-saving techniques (e.g., ADB, DPST, etc.). At block 360, backlight is changed by the available power-setting techniques (e.g., by ADB and/or by the DPST). At block 365, the calculator calculates saved power, while, at block 370, the displayer displays the sum and average saved power by each power-saving technique. At block 370, the monitor keeps monitoring the next backlight change.

Figure 4A:
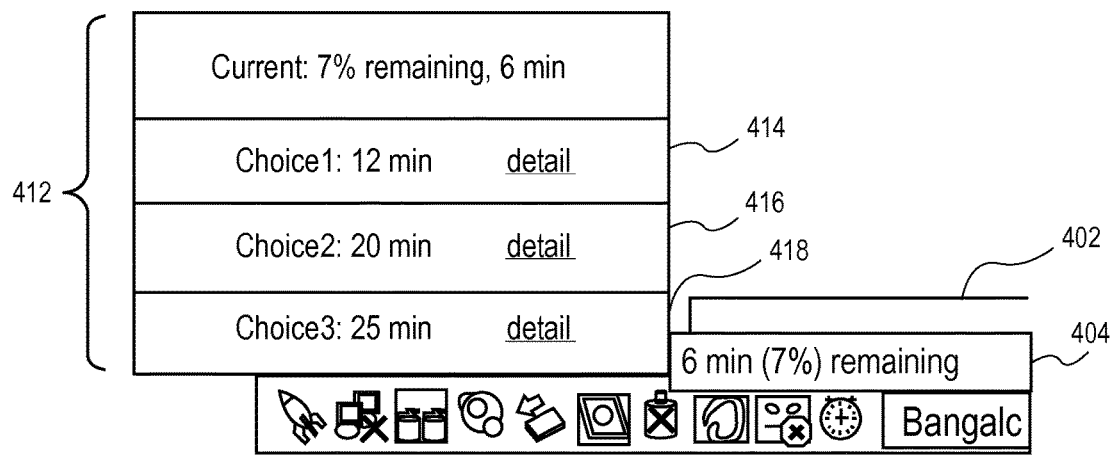
FIG. 4A illustrates a screenshot providing a list of power-saving options available at and supported by the computing device according to one embodiment of the invention.
Figure 4B:
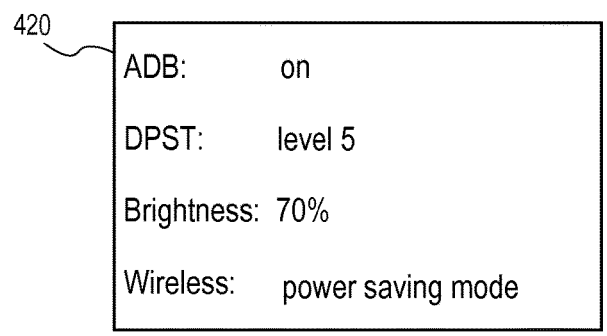
FIG. 4B illustrates details of an option chosen from one of the options provided in FIG. 4A according to one embodiment of the invention.

FIG. 4A illustrates a screen shot having a GUI-like window or screen 402 providing a current battery status 404 (e.g., 6 min or 7% of battery life remaining) and, in one embodiment, a list 412 of various power-saving options available at and supported by the computing device and as determined by the PEAS mechanism of FIG. 1. The illustrated list 412 provides a number of options, such as choice 1 saving 12 minutes of battery life 414, choice 2 saving 20 minutes of battery life 416, and choice 3 saving 25 minutes of battery life 418, etc. The list further provides the user with a choice of clicking on details of any of the options 414-418 to see further details regarding that option. For example, referring now to FIG. 4B, if the user clicks on details of choice 1 414, the user may encounter a pop-up details list 420 showing, for example, ADB power-saving technique is "on" (as opposed to being "off"), DPST is at level 5, brightness remains at 70%, while the wireless option is in power-saving mode.

Figure 4C:
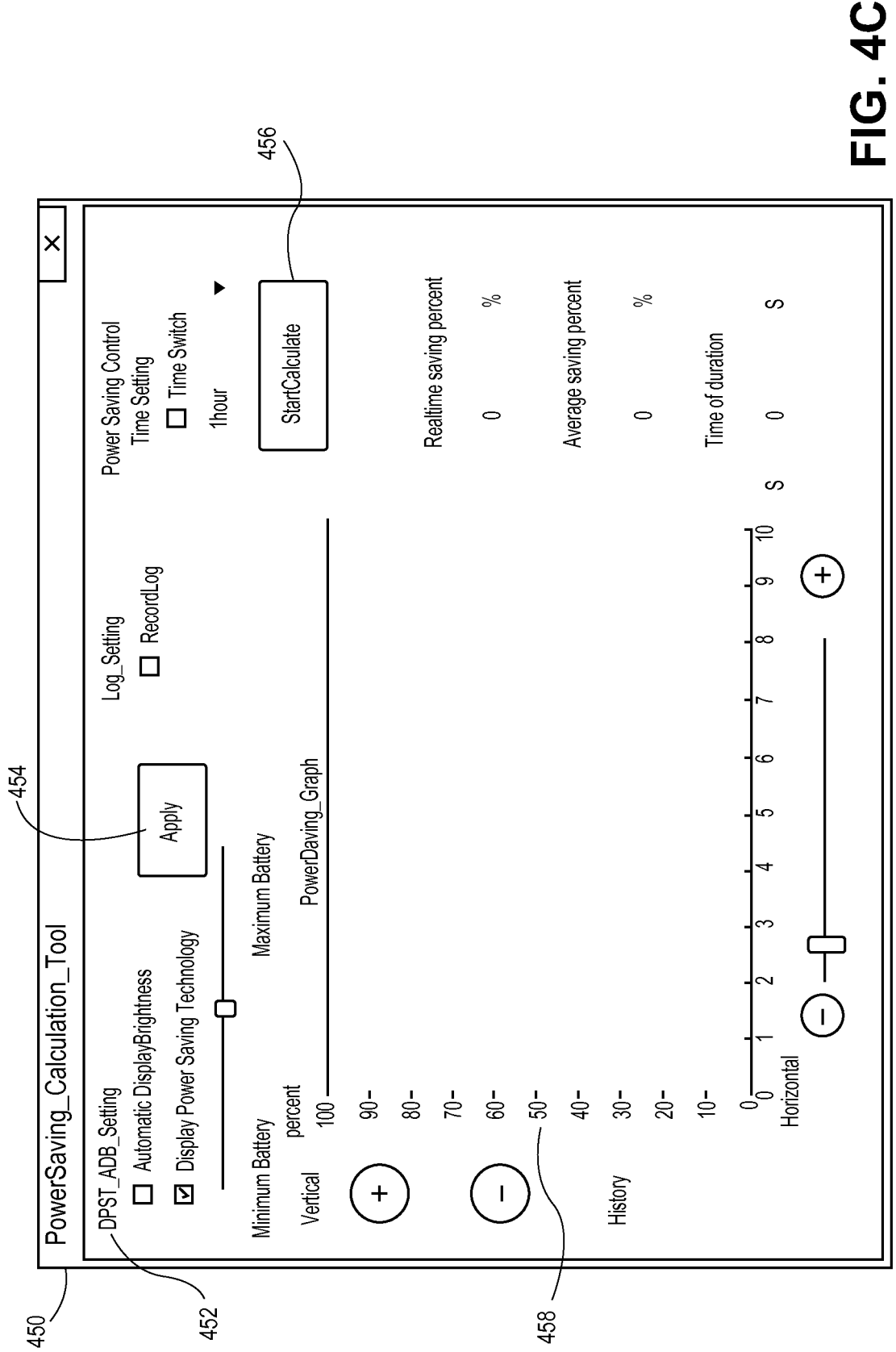
FIG. 4C illustrates a screenshot providing a power-saving calculation service tool of the power extension assistant service mechanism according to one embodiment of the invention.

Now referring to FIG. 4C, it reflects another GUI-like screen 450 providing the user with a power-saving calculation service tool provided by the PEAS mechanism and PSCM components of the preceding figures. Here, the screen 450 provides the user the option of setting, for example, a DSPT/ADB setting 452, such as choosing "display power saving technology" and/or "automatic display brightness", etc. The user may then click to "apply" 454 the settings, and begin calculations by clicking "start calculate" 456. These power saving calculations may be displayed for the user in a number of ways, such as by graph 458, in charts, through text, etc. It is contemplated that FIGS. 4A, 4B and 4C merely illustrate examples (for brevity, clarity, and ease of understanding) and that embodiments of the present inventions are not limited to these illustrated examples.

Figure 5:
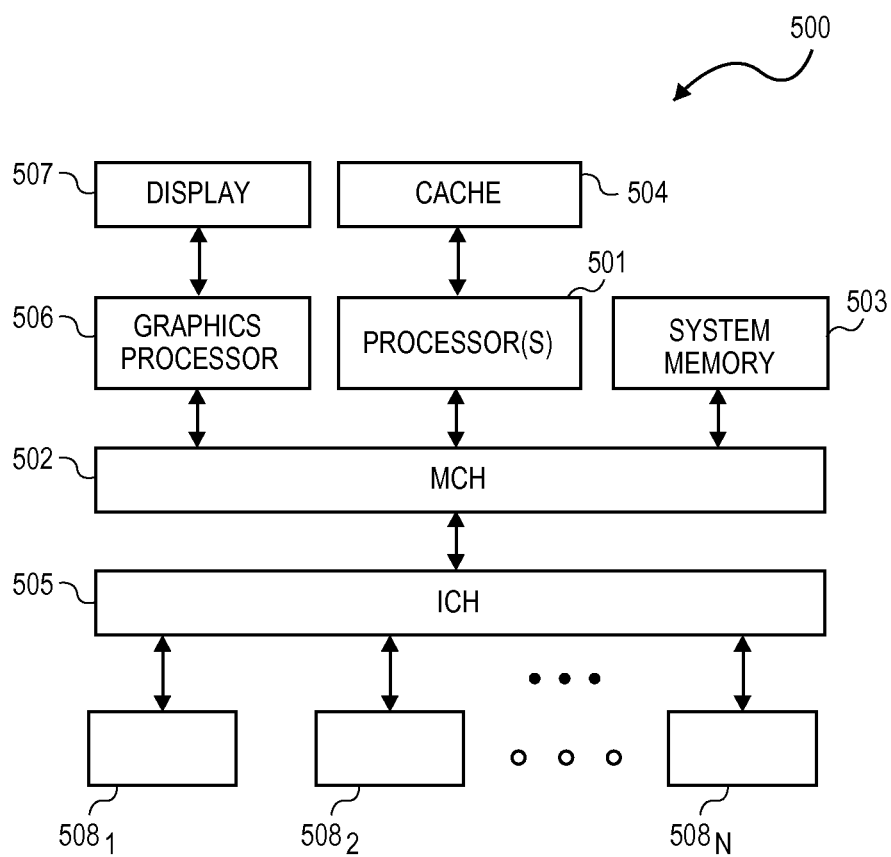
FIG. 5 illustrates a computing system according to one embodiment of the invention.

FIG. 5 illustrates a computing system 500 employing and facilitating a power extension assistant service mechanism as referenced throughout this document according to one embodiment of the invention. The exemplary computing system 500 may be the same as or similar to the computing device 100 FIG. 1 and include: 1) one or more processors 501 at least one of which may include features described above; 2) a memory control hub (MCH) 502; 3) a system memory 503 (of which different types exist such as double data rate RAM (DDR RAM), extended data output RAM (EDO RAM) etc.); 4) a cache 504; 5) an input/output (I/O) control hub (ICH) 505; 6) a graphics processor 506; 7) a display/screen 507 (of which different types exist such as Cathode Ray Tube (CRT), Thin Film Transistor (TFT), Light Emitting Diode (LED), Molecular Organic LED (MOLED), Liquid Crystal Display (LCD), Digital Light Projector (DLP), etc.; and 8) one or more I/O devices 508.

The one or more processors 501 execute instructions in order to perform whatever software routines the computing system implements. The instructions frequently involve some sort of operation performed upon data. Both data and instructions are stored in system memory 503 and cache 504. Cache 504 is typically designed to have shorter latency times than system memory 503. For example, cache 504 might be integrated onto the same silicon chip(s) as the processor(s) and/or constructed with faster static RAM (SRAM) cells whilst system memory 503 might be constructed with slower dynamic RAM (DRAM) cells. By tending to store more frequently used instructions and data in the cache 504 as opposed to the system memory 503, the overall performance efficiency of the computing system improves.

System memory 503 is deliberately made available to other components within the computing system. For example, the data received from various interfaces to the computing system (e.g., keyboard and mouse, printer port, Local Area Network (LAN) port, modem port, etc.) or retrieved from an internal storage element of the computer system (e.g., hard disk drive) are often temporarily queued into system memory 503 prior to their being operated upon by the one or more processor(s) 501 in the implementation of a software program. Similarly, data that a software program determines should be sent from the computing system to an outside entity through one of the computing system interfaces, or stored into an internal storage element, is often temporarily queued in system memory 503 prior to its being transmitted or stored.

The ICH 505 is responsible for ensuring that such data is properly passed between the system memory 503 and its appropriate corresponding computing system interface (and internal storage device if the computing system is so designed). The MCH 502 is responsible for managing the various contending requests for system memory 503 accesses amongst the processor(s) 501, interfaces and internal storage elements that may proximately arise in time with respect to one another.

One or more I/O devices 508 are also implemented in a typical computing system. I/O devices generally are responsible for transferring data to and/or from the computing system (e.g., a networking adapter); or, for large scale non-volatile storage within the computing system (e.g., hard disk drive). ICH 505 has bi-directional point-to-point links between itself and the observed I/O devices 508.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the foregoing specification, the invention has been described with reference to specific exemplary embodiments thereof. It will, however, be evident that various modifications and changes may be made thereto without departing from the broader spirit and scope of the invention as set forth in the appended claims. The Specification and drawings are, accordingly, to be regarded in an illustrative rather than a restrictive sense.

We claim:

1. One or more non-transitory computer-readable storage medium configured to store instructions that, when executed by a processor, cause the processor to:
   estimate a first battery remaining time if an apparatus is to operate in a current mode of operation;
   display, on a display screen of the apparatus, the first battery remaining time;
   display identification of a plurality of power saving modes;
   estimate a second battery remaining time if the apparatus is to operate in a first power saving mode of the plurality of power saving modes, and a third battery remaining time if the apparatus is to operate in a second power saving mode of the plurality of power saving modes, wherein the first and second power saving modes are different from the current mode of operation;
   display, while the apparatus is to operate in the current mode of operation, the second battery remaining time, and information relevant to the first power saving mode;
   display, while the apparatus is to operate in the current mode of operation, the third battery remaining time, and information relevant to the second power saving mode;
   activate, in response to a first selection, the first power saving mode; and
   operate the apparatus in accordance with the first power saving mode.

2. The one or more non-transitory computer-readable storage medium of claim 1, wherein the instructions, when executed, further cause the processor to:
   calculate, while the apparatus is to operate in the current mode of operation, potential power saving by one or more of a plurality of power-saving techniques supported by the apparatus if the apparatus operates in the first power saving mode.

3. The one or more non-transitory computer-readable storage medium of claim 1, wherein the instructions, when executed, further cause the processor to:
   support, while the apparatus is to operate in the first power saving mode, one or more of a plurality of power-saving techniques,
   wherein the one or more of the plurality of power-saving techniques include operating a wireless interface of the apparatus in a low power mode.

4. The one or more non-transitory computer-readable storage medium of claim 1, wherein the instructions, when executed, further cause the processor to:
   support, while the apparatus is to operate in the first power saving mode, one or more of a plurality of power-saving techniques,
   wherein the one or more of the plurality of power-saving techniques include reducing a brightness of the display screen of the apparatus.

5. The one or more non-transitory computer-readable storage medium of claim 1, wherein the instructions, when executed, further cause the processing to:
   simultaneously display, while the apparatus is to operate in the current mode of operation:
   the first battery remaining time,
   identification of the plurality of power saving modes, and
   a fourth battery remaining time if the apparatus is to operate in a standby mode of operation.

6. The one or more non-transitory computer-readable storage medium of claim 1, wherein the instructions, when executed, further cause the processor to:
   simultaneously display, while the apparatus is to operate in the current mode of operation:
   the first battery remaining time,
   the second battery remaining time, and
   the third battery remaining time.

7. The one or more non-transitory computer-readable storage medium of claim 1, wherein the apparatus is a mobile phone.

8. The one or more non-transitory computer-readable storage medium of claim 1, wherein the instructions, when executed, further cause the processing to:
   simultaneously display, while the apparatus is to operate in the current mode of operation, the first battery remaining time, the second battery remaining time, and a third battery remaining time if the apparatus is to operate in a standby mode of operation.

9. A mobile device comprising:
a display screen;
a memory to store instructions; and
a processor coupled to the memory,
wherein the processor is to execute the instructions, wherein the instructions, when executed, cause the processor to:
estimate a first battery remaining time if a mobile device is to operate in a current mode of operation;
estimate, while the mobile device operates in the current mode of operation, a second battery remaining time if the mobile device is to operate in a first power saving mode of the plurality of power saving modes, and a third battery remaining time if the mobile device is to operate in a second power saving mode of the plurality of power saving modes, wherein the first and second power saving modes are different from the current mode of operation;
display, while the apparatus is to operate in the current mode of operation and on the display screen, the first battery remaining time, the second battery remaining time, and the third battery remaining time;
activate, in response to a first selection, the first power saving mode; and
operate the mobile device in accordance with the first power saving mode.

10. The mobile device of claim 9, wherein the instructions, when executed, further cause the processor to:
display, while the apparatus is to operate in the current mode of operation and on the display screen, information relevant to the first power saving mode.

11. The mobile device of claim 9, wherein the instructions, when executed, further cause the processor to:
estimate, while the apparatus is to operate in the current mode of operation, potential power saving by one or more of a plurality of power-saving techniques supported by the mobile device if the mobile device operates in the first power saving mode.

12. The mobile device of claim 9, wherein the instructions, when executed, further cause the processor to:
support, while the mobile device operates in the first power saving mode, one or more of a plurality of power-saving techniques,
wherein the one or more of the plurality of power-saving techniques include switching off a wireless connection of the apparatus.

13. The mobile device of claim 9, wherein the instructions, when executed, further cause the processor to:
support, while the mobile device operates in the first power saving mode, one or more of a plurality of power-saving techniques,
wherein the one or more of the plurality of power-saving techniques include operating a wireless connection of the mobile device in a low power mode.

14. The mobile device of claim 9, wherein the instructions, when executed, further cause the processor to:
support, while the mobile device operates in the first power saving mode, one or more of a plurality of power-saving techniques,
wherein the one or more of the plurality of power-saving techniques include switching off a wireless interface of the mobile device.

15. The mobile device of claim 9, wherein the instructions, when executed, further cause the processor to:
simultaneously display, while the mobile device operates in the current mode of operation:
the first battery remaining time,
identification of the plurality of power saving modes, and
a fourth battery remaining time if the mobile device is to operate in a standby mode of operation.

16. The mobile device of claim 9, further comprising:
wireless interface configured to communicate with one or more of another mobile device, an access point or a base station.

17. A computer implemented method comprising:
estimating a first battery remaining time if an apparatus is to operate in a current mode of operation;
displaying the first battery remaining time;
displaying identification of a plurality of power saving modes;
estimating, while the apparatus is to operate in the current mode of operation, a second battery remaining time if the apparatus is to operate in a first power saving mode of the plurality of power saving modes and a third battery remaining time if the apparatus is to operate in a second power saving mode of the plurality of power saving modes, wherein the first and second power saving modes are different from the current mode of operation;
displaying, while the apparatus is to operate in the current mode of operation, the second battery remaining time, and information relevant to the first power saving mode;
displaying, while the apparatus is to operate in the current mode of operation, the third battery remaining time, and information relevant to the second power saving mode;
activating, in response to a first selection, the first power saving mode; and
operating the apparatus in accordance with the first power saving mode.

18. The method of claim 17, further comprising:
supporting, while the apparatus is to operate in the first power saving mode, one or more of a plurality of power-saving techniques,
wherein the one or more of the plurality of power-saving techniques include one or both of reducing a brightness of the display screen of the apparatus or operating a wireless interface of the mobile device in a low power mode.

19. The method of claim 17, further comprising:
simultaneously displaying, while the apparatus is to operate in the current mode of operation:
the first battery remaining time,
identification of the plurality of power saving modes, and
a fourth battery remaining time if the apparatus is to operate in a standby mode of operation.

20. The apparatus comprising:
means for estimating a first battery remaining time if an apparatus is to operate in a current mode of operation;
means for displaying the first battery remaining time;
means for displaying identification of a plurality of power saving modes;
means for estimating, while the apparatus is to operate in the current mode of operation, a second battery remaining time if the apparatus is to operate in a first power saving mode of the plurality of power saving modes, and a third battery remaining time if the apparatus is to operate in a second power saving mode of the plurality of power saving modes, wherein the first and second power saving modes are different from the current mode of operation;

means for displaying, while the apparatus is to operate in the current mode of operation, the second battery remaining time, and information relevant to the first power saving mode;

means for displaying, while the apparatus is to operate in the current mode of operation, the third battery remaining time, and information relevant to the second power saving mode;

means for activating, in response to a first selection, the first power saving mode; and means for operating the apparatus in accordance with the first power saving mode.

21. The apparatus of claim 20, further comprising:

means for simultaneously displaying, while the apparatus is to operate in the current mode of operation:

the first battery remaining time, identification of the plurality of power saving modes, and a fourth battery remaining time if the apparatus is to operate in a standby mode of operation.

22. One or more non-transitory computer-readable storage medium configured to store instructions that, when executed by a processor, cause the processor to:

estimate a first battery remaining time if an apparatus is to operate in a current mode of operation;

estimate a second battery remaining time if the apparatus is to operate in a first power saving mode, wherein the first power saving mode is different from the current mode of operation; and display, on a display screen of the apparatus, the first battery remaining time; and display, while the apparatus is to operate in the current mode of operation, the second battery remaining time, and information relevant to the first power saving mode.

23. The one or more non-transitory computer-readable storage medium of claim 22, wherein the instructions, when executed, further cause the processor to:

activate, in response to a first selection, the first power saving mode; and operate the apparatus in accordance with the first power saving mode.

* * * * *